3,455,331
TORQUE LIMITING WICKET GATE OPERATING
MECHANISM FOR HYDRAULIC MACHINES
Kurt Baumann and Wilhelm Schürenberg, Ravensburg,
Germany, assignors to Escher Wyss Aktiengesellschaft,
Zurich, Switzerland, a corporation of Switzerland
Filed June 3, 1966, Ser. No. 555,049
Claims priority, application Switzerland, June 4, 1965,
7,884/65
Int. Cl. F03b *15/04;* F16k *31/52*
U.S. Cl. 137—601                                                3 Claims

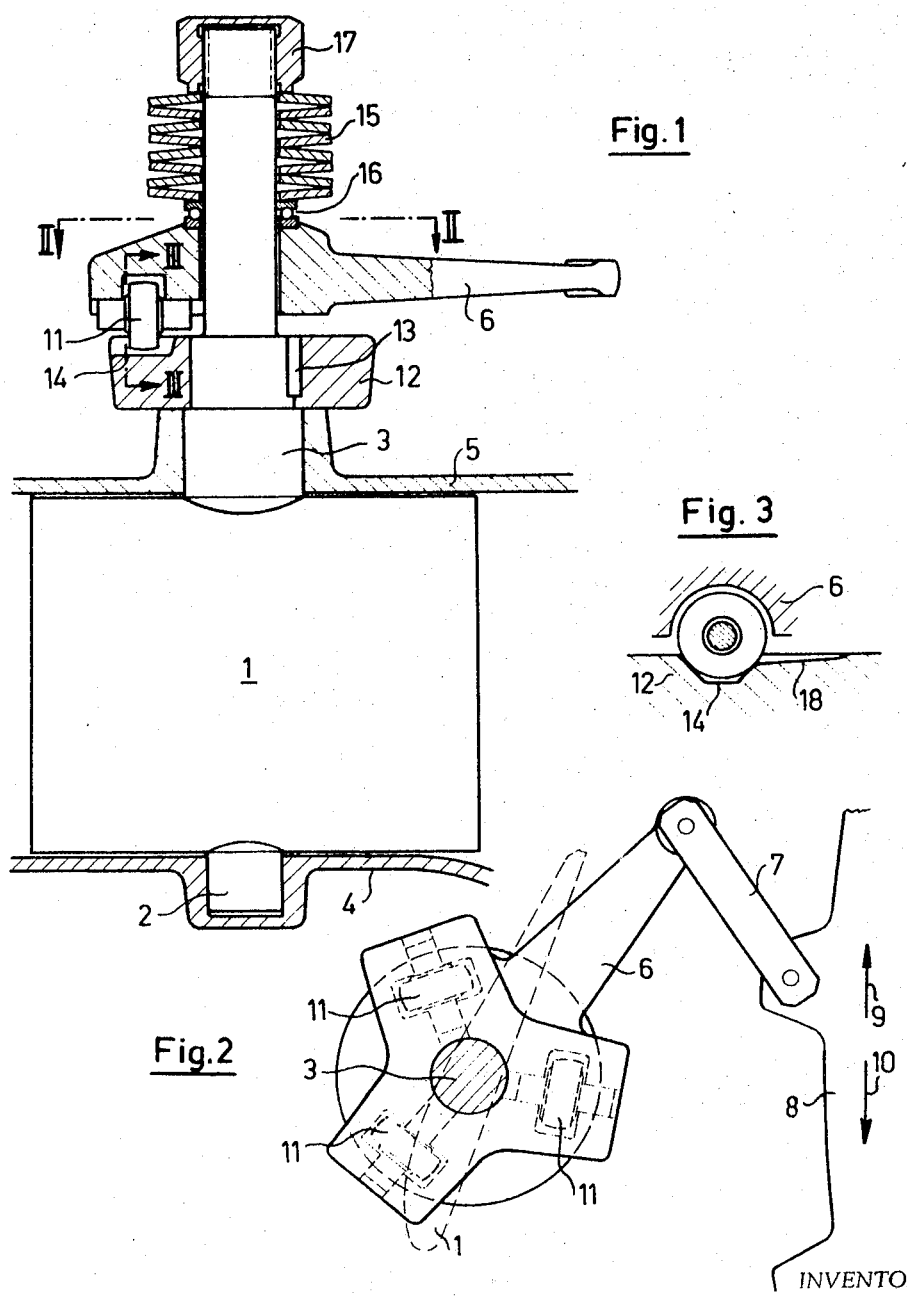

ABSTRACT OF THE DISCLOSURE

A self-restoring, torque-limiting device for the shafts of the individual wicket gates of a Kaplan turbine, a Francis turbine or the like.

In hydraulic machines, such as Kaplan turbines, Frances turbines, accumulator pumps or pump-turbines, it is known to mount fast on the bearing shafts of the rotatable wicket gates of the adjustable guide apparatus gate operating levers, which are actuated by an adjusting ring, common to all the wicket gates, through pivotally mounted links. The adjusting ring, as a rule, is operated by means of one or more hydraulic servomotors.

Unless special precautions are taken, this arrangement is known to suffer from the drawback that if a foreign body becomes jammed between two adjacent wicket gates, the other wicket gates also cannot be closed, without the guide apparatus being damaged. A known step for mitigating this drawback is to provide a torque limiting device between wicket gate and adjusting ring. For example, the links are so designed that if, in the closing operation, a wicket gate comes against an obstacle, the associated link breaks at a predetermined place, before important parts of the guide system are subject to excessive stress. The fracture is here restricted to easily replaceable parts.

This step, however, is unsatisfactory because on response of the safety fracture device, the wicket gate concerned remains open after elimination of the obstacle, because the entire adjusting force is concentrated on the remaining wicket gates in the closed position, and there is a risk that the safety fracture devices of these wicket gates respond, and finally because the replacement of the parts damaged on response of the safety fracture device can involve an undesirable interruption in operation.

The requirement to be able to close the guide apparatus in a reliable manner arises particularly in the case of large Kaplan or Francis turbines in which, for reasons of economy, no special quick-acting closure elements are provided at the turbine inlet or outlet.

It is true that the shortcomings described may be obviated by providing each wicket gate with its own servomotor, which acts directly on the wicket gate without interposition of a safety fracture device, each individual servomotor being controlled by a separate, restored control valve. A disadvantage of this step, however, is the considerable technical expenditure which it necessarily involves.

The same effect is to be attained with the present invention with little technical expenditure. The invention relates to an adjustable guide apparatus of a water turbine or pump having rotatable wicket gates and operating levers mounted on the gate shafts, which levers are operatively connected to a gate adjusting ring common to all the wicket gates, and in particular to a torque limiting wicket gate operating mechanism. According to the invention, for transmitting the adjusting torque from the operating lever to the wicket gate, there is provided a torque transmitting member which is non-rotatably mounted on the gate shaft axially adjacent the operating lever. The torque transmitting member and the operating lever are axially displaceable in relation to one another and pressed toward one another by spring action. One of the two sides facing one another of the operating lever and the torque transmitting member has at least one axially extending projection, and the other of these two sides has a recess adapted to receive with said projection and formed in such a manner that on a predetermined limit torque being exceeded, the projection is lifted against the spring action and disengaged from the groove.

Proceeding now to a more detailed discription of the invention, reference will be had to an embodiment example illustrated on the accompanying drawing, in which FIG. 1 shows a section through a torque limiting wicket gate operating mechanism in a plane passing through the gate shaft axis, FIG. 2 shows a section on the line II—II in FIG. 1, and FIG. 3 shows a section on the line III—III in FIG. 1.

The guide system of a hydraulic turbine possesses an annular series of rotatable wicket gates 1, each of which has a lower shaft 2 and an upper shaft 3. These shafts are journalled respectively in the turbine covers 4 and 5. Mounted on the gate shaft 3 passing through the bearing point in the turbine cover 5 is an operating lever 6 operatively connected by a link 7 to an adjusting ring 8 common to all the gates. The adjusting ring is operated by a servomotor not shown. The arrow 9 indicates the movement of the adjusting ring 8 in the closing direction and the arrow 10 that in the opening direction.

The operating lever 6 is rotatably mounted on the shaft 3 of the wicket gate 1. Three projections formed by rollers 11 are provided for transmitting the adjusting torque from the operating lever 6 to the gate shaft 3. These rollers 11 are mounted in the operating lever 6 uniformly distributed around the gate shaft 3, with their axes directed radially in relation to the gate shaft 3. A torque transmitting member consisting of a cam disc 12 is mounted non-rotatably on the gate shaft 3 co-axially with the latter. The gate shaft 3 is rigidly secured to this cam disc 12 by means of a cotter 13. The cam disc 12 lies below the operating lever 6, and on the side facing the rollers 11 has grooves 14 adapted to engage with the rollers 11.

The operating lever 6 is mounted rotatable and axially shiftable on the gate shaft 3. The operating lever 6 and the cam disc 12 are thus axially displaceable in relation to one another. Normally the rollers 11 lie in the grooves 14 of the cam disc 12. A cup spring 15, composed of a number of elements, presses the operation lever 6 with the rollers 11 through an axial ball bearing 16 in a direction toward the cam disc 12. The counterpressure of the spring 15 is taken up by a cap nut 17, whereby the shaft 3 is stressed by tension.

The rollers 11 are held in the grooves 14 of the cam disc 12 by the pressure of the spring 15, so that the adjusting torque is transmitted from the operating lever 6 through the rollers 11 to the cam disc 12 and hence to the gate shaft 3. The walls of the grooves are so inclined that on a predetermined limit adjusting torque being exceeded, the rollers 11 are lifted axially against the spring pressure and disengaged from the grooves. If a resistance opposes the closure of the wicket gate, for example by jamming of a foreign body, the operating lever 6, after disengagement of the rollers 11, can nevertheless continue to rotate according to the movement of the adjusting ring 8 around the gate shaft 3, the rollers 11 rolling on a circular path over the cam disc 12.

Special guide or rolling tracks 18 are provided on the cam disc 12 for the disengaged rollers 11. These rolling tracks 18 have a rise in the circumferentially directed direction of the cam disc 12. The pressure of the rollers 11 on the rolling tracks therefore has a peripheral component, which exerts a closing moment on the gate shaft 3. Even after disengagement of the rollers 11, therefore, the wicket gate 1 is not free, but will be urged closed by the circumferentially directed component acting on the rollers while on the inclined guide tracks 18. This circumferential component exerts a moment on the rollers which is smaller than the limit adjusting torque required to displace the rollers 11 from the grooves 14.

What is claimed is:

1. In a hydraulic machine having a guide apparatus for throughflowing fluid comprising an annular series of wicket gates, and an adjusting ring common to all the wicket gates for the operation of said wicket gates; a torque limiting wicket gate operating mechanism comprising in combination a machine cover; a wicket gate having a gate shaft rotatably journalled in a portion of said machine cover; a gate operating lever mounted rotatably on said shaft; a torque transmitting member mounted non-rotatably on said shaft axially adjacent operating lever; said operating lever and said torque transmitting member being axially displaceable in relation to one another; means operatively connecting said gate operating lever to said gate adjusting ring; and spring means pressing said gate operating lever and said torque transmitting member toward one another in the axial direction of the gate shaft; a roller rotatable about an axis extending radially from said shaft and forming an axial projection from one of the juxtaposed surfaces of the operating lever and said torque transmitting member and a recess formed in the other juxtaposed surface normally receiving said roller, said roller disengaged from said recess against the action of said spring means when a predetermined limit torque is exceeded, said recess being provided with a guide track to receive said roller after its disengagement from said recess, said guide track being inclined circumferentially of the wicket shaft and exerting a closing moment, smaller than said limit torque, on said roller and said wicket shaft when the roller is engaged by the guide track.

2. In a hydraulic machine, a torque limiting wicket gate operating mechanism comprising in combination a machine cover; a wicket gate having a gate shaft rotatably journalled in a portion of said machine cover; a gate adjusting ring; a gate operating lever mounted rotatably on said gate shaft; means operatively connecting said gate operating lever to said gate adjusting ring; a cam disc mounted non-rotatably on said gate shaft axially adjacent said gate operating lever; said cam disc and said gate operating lever being axially displaceable in relation to one another; spring means pressing said cam disc and said gate operating lever toward one another in the axial direction of the gate shaft; said gate operating lever being provided on its side facing the cam disc with three projecting rollers uniformly distributed around the gate shaft and having axes of rotation extending radially of the gate shaft; said cam disc being provided with grooves adapted to engage with said rollers, said grooves having walls inclined relatively to the disc surface so that, on a predetermined limit torque being exceeded, said rollers are disengaged from said grooves against the action of said spring means; and said cam disc being further provided with rolling tracks for the disengaged rollers, said rolling tracks being inclined circumferentially of the wicket shaft so that the rollers pressed onto said rolling tracks exert a closing moment on the gate shaft smaller than said limit torque.

3. The combination defined in claim 2 in which the came disc is rigidly connected to the gate shaft and the rotatably mounted gate operating lever is axially shiftable along the gate shaft; said spring means being arranged to apply counteracting axially directed forces to the shaft and the gate operating lever, respectively, so as to press said rollers against said cam disc.

References Cited

UNITED STATES PATENTS

| 2,760,361 | 8/1956 | Ruthinger | 192—56 X |
| 2,969,133 | 1/1961 | Langcheck | 192—56 |
| 3,030,072 | 4/1962 | Boyd | 253—122 |

FOREIGN PATENTS 588,459 11/1933 Germany.

WILLIAM F. O'DEA, Primary Examiner

D. H. LAMBERT, Assistant Examiner

U.S. Cl. X.R.

251—80; 253—122

PO-1050
(5/69)

UNITED STATES PATENT OFFICE
CERTIFICATE OF CORRECTION

Patent No. 3,455,331  Dated July 15, 1969

Inventor(s) Kurt Baumann, et al.

It is certified that error appears in the above-identified patent and that said Letters Patent are hereby corrected as shown below:

Column 3, line 36, after "roller" (second occurrence) insert -- being --

Column 4, line 26, "came" should read -- cam --

SIGNED AND
SEALED

NOV 4 1969

(SEAL)
Attest:

Edward M. Fletcher, Jr.
Attesting Officer

WILLIAM E. SCHUYLER, JR.
Commissioner of Patents